United States Patent
Shelton et al.

(10) Patent No.: US 8,009,437 B2
(45) Date of Patent: Aug. 30, 2011

(54) WIRELESS COMMUNICATION MODULES

(75) Inventors: Gary W. Shelton, Huntsville, AL (US); Terry G. Phillips, Meridianville, AL (US); Thomas J. Watson, Madison, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 786 days.

(21) Appl. No.: 12/114,546

(22) Filed: May 2, 2008

(65) Prior Publication Data
US 2008/0274630 A1 Nov. 6, 2008

Related U.S. Application Data

(60) Provisional application No. 60/915,536, filed on May 2, 2007, provisional application No. 60/915,552, filed on May 2, 2007, provisional application No. 60/915,571, filed on May 2, 2007, provisional application No. 60/937,031, filed on Jun. 25, 2007, provisional application No. 60/953,630, filed on Aug. 2, 2007, provisional application No. 60/915,458, filed on May 2, 2007.

(51) Int. Cl.
*H05K 7/02* (2006.01)
(52) U.S. Cl. .......... 361/772; 361/770; 361/814; 439/44; 439/55; 439/70
(58) Field of Classification Search .................. 361/772, 361/777, 778, 814
See application file for complete search history.

(56) References Cited

U.S. PATENT DOCUMENTS

| 7,286,850 | B2 * | 10/2007 | Frielink et al. ................. 455/557 |
| 7,328,243 | B2 | 2/2008 | Yeager et al. |
| 7,546,140 | B2 * | 6/2009 | Sinai ........................ 455/552.1 |
| 7,778,600 | B2 * | 8/2010 | Godwin et al. .............. 455/41.1 |
| 2005/0129097 | A1 | 6/2005 | Strumpf et al. |
| 2006/0282498 | A1 | 12/2006 | Muro |
| 2007/0161404 | A1 * | 7/2007 | Yasujima et al. ............. 455/557 |
| 2007/0250930 | A1 | 10/2007 | Aziz et al. |
| 2008/0229415 | A1 | 9/2008 | Kapoor et al. |
| 2008/0291654 | A1 * | 11/2008 | Liao et al. ..................... 361/818 |

FOREIGN PATENT DOCUMENTS

WO WO03090411 10/2003

\* cited by examiner

*Primary Examiner* — Dameon E Levi
(74) *Attorney, Agent, or Firm* — Lanier Ford Shaver & Payne, P.C.; Jon E. Holland

(57) ABSTRACT

The present disclosure generally pertains to wireless communication modules that can be used for enabling wireless communication in various applications. A wireless communication module in accordance with one embodiment may be interfaced with other devices, such as nodes of a wireless sensor network (WSN). The module has rows of male integrated circuit (IC) pins that may be interfaced with female pin receptacles of another device. The module receives wireless signals and provides the data of such wireless signals to the other device. The module also receives data from the other devices and packetizes such data for wireless communication.

22 Claims, 5 Drawing Sheets

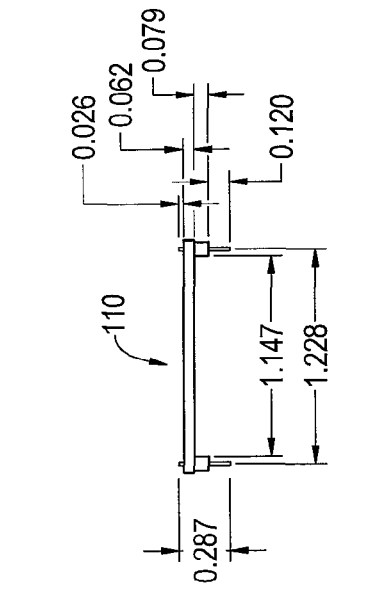
FIG. 6
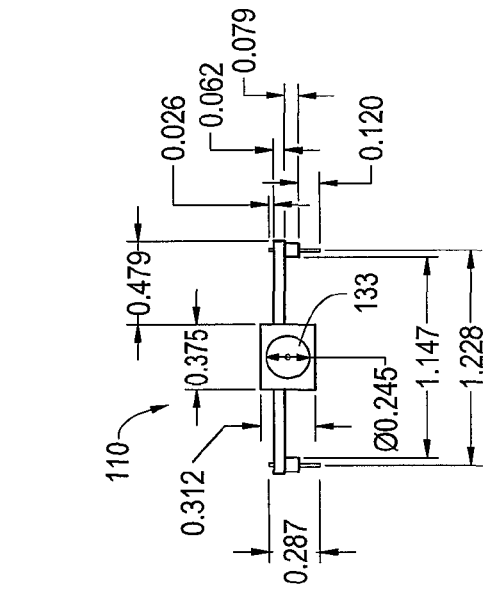
FIG. 9
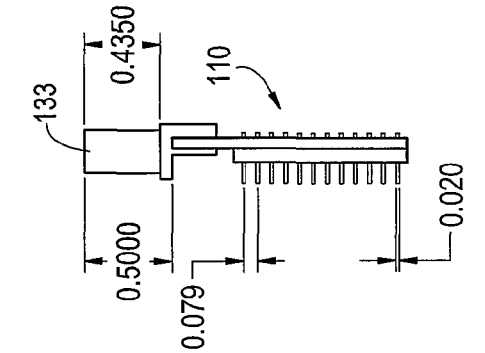
FIG. 5
FIG. 8
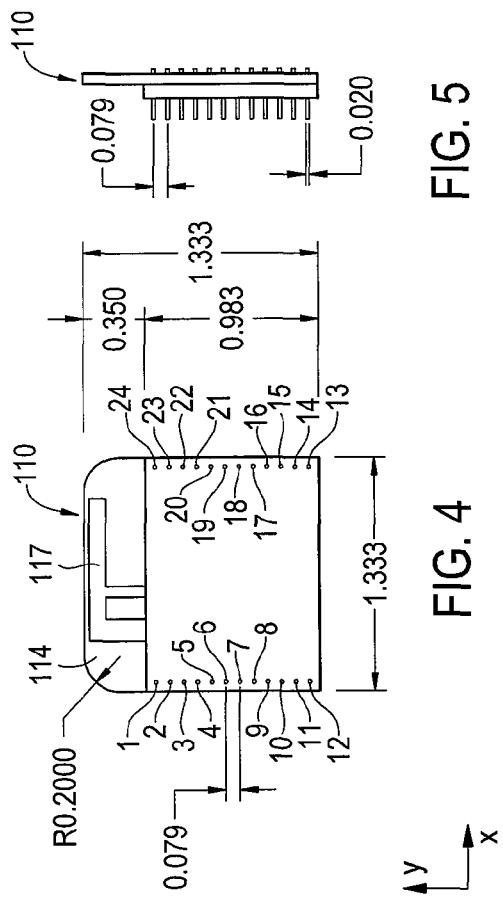
FIG. 4
FIG. 7

WIRELESS COMMUNICATION MODULES

CROSS REFERENCE TO RELATED APPLICATIONS

This application claims priority to U.S. Provisional Patent Application No. 60/915,536, entitled "Wireless Communication Modules," and filed on May 2, 2007, which is incorporated herein by reference. This application also claims priority to U.S. Provisional Patent Application No. 60/915,552, entitled "Nodes for Wireless Sensor Networks," and filed on May 2, 2007, which is incorporated herein by reference. This application claims priority to U.S. Provisional Patent Application No. 60/915,571, entitled "Sensor Networks," and filed on May 2, 2007, which is incorporated herein by reference. This application claims priority to U.S. Provisional Patent Application No. 60/937,031, entitled "Sensor Networks," and filed on Jun. 25, 2007, which is incorporated herein by reference. This application claims priority to U.S. Provisional Patent Application No. 60/953,630, entitled "Sensor Networks," and filed on Aug. 2, 2007, which is incorporated herein by reference. This application claims priority to U.S. Provisional Patent Application No. 60/915,458, entitled "Protocols for Wireless Communication," and filed on May 2, 2007, which is incorporated herein by reference.

RELATED ART

The proliferation of applications using wireless communication is increasing as more and more users seek solutions that provide increased mobility and flexibility. However, wireless communication has numerous challenges and problems. For example, since wireless signals are transmitted through free space, data collisions with other wireless signals from foreign networks can be particularly problematic. Further, the effects of various noise sources and even weather can have a more pronounced effect on wireless communication as compared to communication occurring over physical media. Thus, wireless communication in particularly noisy environments, such as manufacturing plants, can be quite problematic.

Further, in implementing a wireless network, such as a wireless sensor network (WSN), various protocols need to be established and techniques for overcoming some of the aforementioned challenges for wireless communication are necessary. In addition, the functionality and interaction of the nodes of the network can be relatively complex, particularly for wireless networks in which data communication may be unreliable at times due to varying environmental conditions and noise levels. Moreover, engineering a wireless sensor network can be extremely expensive and burdensome.

Techniques for reducing the cost and burden of designing and developing networks, such as wireless sensor networks, are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 4 is a top view of a wireless communication module, such as is depicted in FIG. 1.

FIG. 5 is an edge view of the wireless communication module depicted in FIG. 4.

FIG. 6 is a side view of the wireless communication module depicted in FIG. 4.

FIG. 7 is a top view of a wireless communication module having a SMA interface.

FIG. 8 is an edge view of the wireless communication module depicted in FIG. 7.

FIG. 9 is a side view of the wireless communication module depicted in FIG. 7.

DETAILED DESCRIPTION

The present disclosure generally pertains to wireless communication modules that can be used for enabling wireless communication in various applications. For example, a wireless communication module may be used within a wireless sensor network (WSN) to enable communication among nodes of the WSN. A wireless communication module in at least one exemplary embodiment has a protocol stack that implements a protocol described by U.S. Provisional Patent Application No. 60/915,458, entitled "Protocols for Wireless Communication," and filed on May 2, 2007, which is incorporated herein by reference. However, other types of protocols may be implemented in other embodiments.

Figure 1:
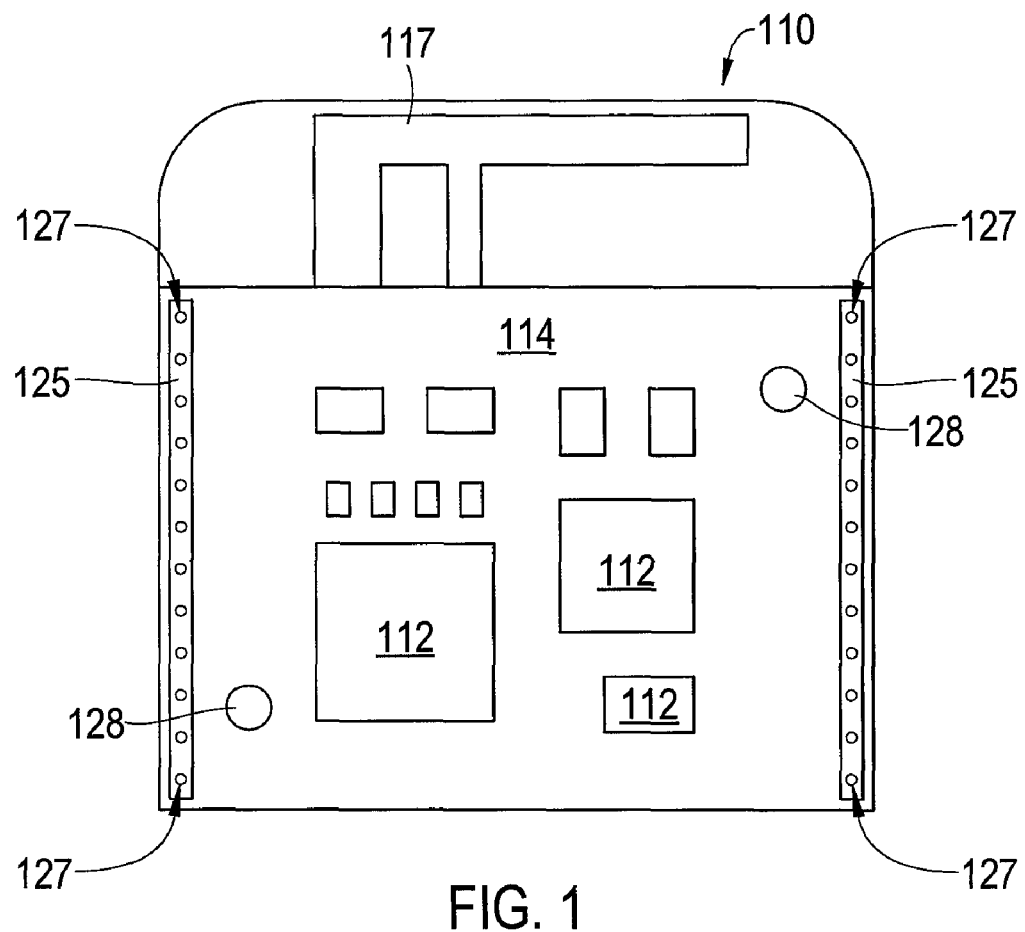
FIG. 1 is a top view of an exemplary embodiment of a wireless communication module in accordance with the present disclosure.

FIG. 1 depicts an exemplary wireless communication module 110 in accordance with an exemplary embodiment of the present disclosure. In at least one embodiment, the module 110 communicates wireless radio frequency (RF) signals and is referred to as an "RF engine." However, in other embodiments, other types of signals may be communicated by the module 110.

The module 110 comprises various circuitry 112 mounted on a printed circuit board (PCB) 114. In at least one embodiment, the circuitry 112 comprises a protocol stack that packetizes data and depacketizes data packets in accordance with a desired protocol. The circuitry 112 also comprises an antenna 117. In the embodiment shown by FIG. 1, the antenna 117 is of a type commonly referred to as an "F-antenna," although other types of antennas may be used in other embodiments.

As shown by FIG. 1, the module 110 comprises a plurality of elongated connectors 125, each of which has a plurality of electrically conductive pins 127. Note that that the reference numeral "127" refers to the pins collectively. In FIG. 4, the pins 127 are individually labeled with reference numerals 1-24.

The pins 127 may be interfaced (e.g., plugged into) connectors of an external device, such as connectors mounted on another PCB (not shown in FIG. 1), referred to hereafter as a "base PCB." Further, the PCB 114 may have holes (not shown in FIG. 1) through which screws or other coupling devices may pass in order to secure to the external device. In this regard, each respective screw or other coupling device may pass through a hole and into the external device. The PCB 114 has holes 128 to enable a shield (not shown) to be mounted on the PCB 114 for covering the circuitry 112. The use of such a shield, however, is unnecessary.

Figure 3:
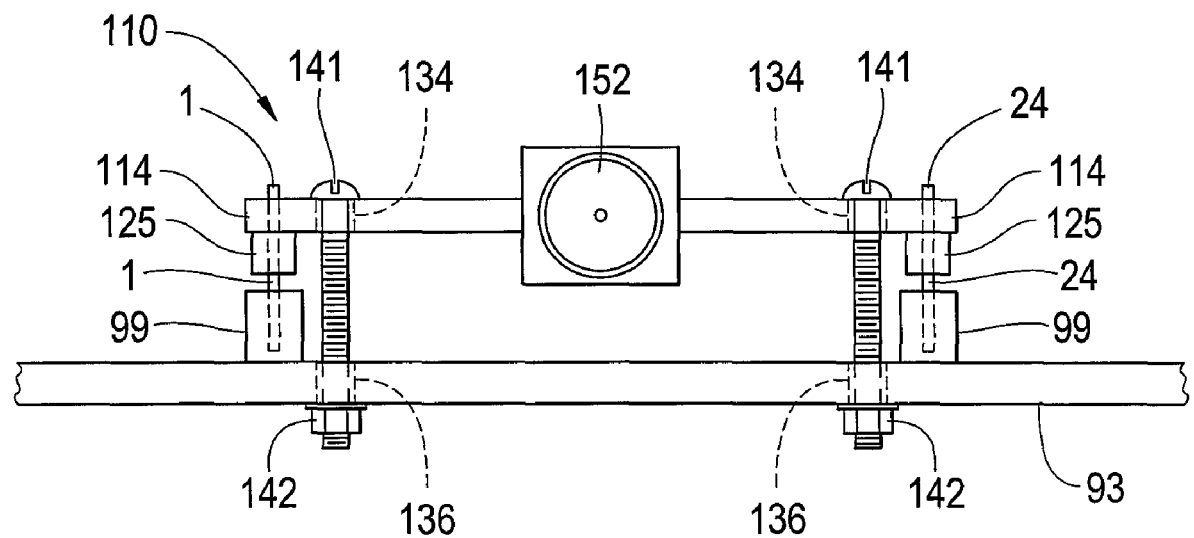
FIG. 3 is a side view of the wireless communication module of FIG. 1 interfaced with the network node of FIG. 2.
Figure 2:
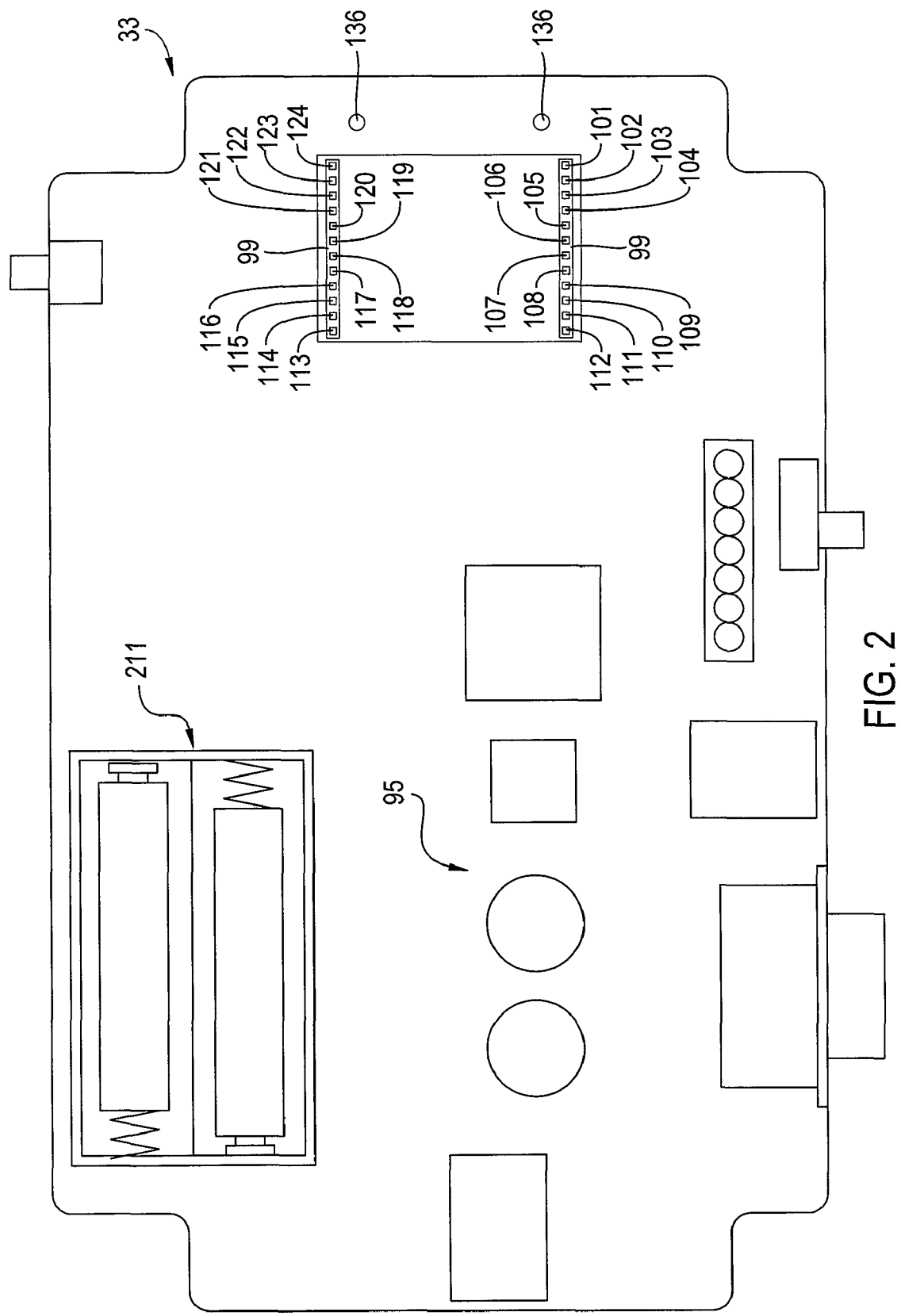
FIG. 2 is a top view of an exemplary embodiment of a network node.

FIG. 2 depicts an exemplary node 33 of a wireless sensor network. The node 33 has a base PCB 93 on which various circuitry 95 resides. The base PCB 93 has a plurality of female pin connectors 99 having receptacles 101-124 for receiving the male input/output pins 127 of the wireless communication module 110. The receptacles 101-124 are arranged such that they can be respectively aligned with the pins 1-24 (FIG. 4) in order to plug the pins 1-24 into the connectors 99. To attach the module 110 to the PCB 93, the module 110 is positioned such that each pin 1-24 is inserted into and received by its respective receptacle 101-124. FIG. 3 depicts the node 33 when the wireless communication module 110 is interfaced with the node 33 via connectors 99. Moreover, when the module 110 and node 33 are interfaced, an electrical signal can be transmitted from any pin 1-24 to the circuitry 95 or vice versa. Note that FIG. 3 shows an embodiment in which a SubMiniature version A (SMA) interface 152 is attached to the module 110. Such an interface 152 can be connected to an antenna (not shown), as known in the art. Other types of interfaces may be used in other embodiments.

During operation, the wireless communication module 110 receives data from the circuitry 95 via the pins 1-24 and packetizes the data for wireless transmission to other nodes of the WSN. Further, the wireless communication module 110 receives packets from other nodes of the WSN and depacketizes the received packets. The module then transmits the payload data of such packets to the circuitry 95 via the pins 1-24. In other embodiments, the wireless communication module 110 may be similarly interfaced with other types of devices in order to provide wireless communication for such devices.

Note that the circuitry 95 and/or 112 may comprise an instruction execution device, such as a digital signal processor, and/or other types of hardware. Portions of the functionality described herein for the node 33 and/or module 110 may be implemented in software and/or firmware, which is executed by an instruction execution device. It should be apparent to one of ordinary skill in the art upon reading this disclosure that various configurations of the circuitry 95 and 112 are possible.

FIGS. 4-6 depict an exemplary embodiment of the module 110. Note that the dimensions shown in FIGS. 4-6, as well as in FIGS. 7-9, are in inches. The configuration, including the dimensions, shown in FIGS. 4-6 are exemplary and other configurations, including other dimensions, are possible. As shown by FIG. 4, module 110 has twenty-four pins 1-24. In other embodiments, other numbers of pins are possible.

As shown by FIGS. 4-6, pins 1-12 form a first row, and pins 13-24 form a second row, which is substantially parallel to the first row. The centers of pins 1-12 are substantially aligned, and the centers of pins 13-24 are aligned. Note that, in FIG. 4, the rows are parallel to the y-direction and perpendicular to the x-direction. Both the x-direction and the y-direction are within the surface plane of the PCB 114. The distance from the pin centers of one row to the pin centers of the other row is about 1.23 inches (in.), although other distances are possible in other embodiments. Further, within each row, each pin is positioned about the same distance from its adjacent pin or pins. For example, in one embodiment, the distance between the centers of two adjacent pins is about 0.08 in., as shown by FIG. 4. Further, each pin in one row is substantially aligned with a respective pin in another row along the x-axis. Thus, a reference line in the x-direction passes through the approximate centers of a pin in one row and a pin in the other row. In one exemplary embodiment, the width (in the x-direction) of each pin 1-24 is about 0.02 in., and the height (in a direction perpendicular to both the x-direction and the y-direction) is about 0.12 in. The pins 1-24 can have a variety of shapes. For example in one embodiment, the cross-sectional shape of each pin 1-24 is circular. In another embodiment, the cross-sectional shape of each pin 1-24 is a square, but other cross-sectional shapes are possible in other embodiments. Although not explicitly shown in FIGS. 4-9, the distance of the centers of pins 12 and 13 are 0.047 inches in the y-direction from the bottom edge (i.e., the edge opposite of the SMA interface 152) of the PCB 114. In addition, the dimensions of the module 110 described above are exemplary, and other dimensions are possible in other embodiments.

Note that the terms "about," "substantially," and "approximate," as used herein, refer to the fact that there are allowable tolerances in the pin positioning without damaging the module 110 when it is interfaced with connectors 99. In this regard, a connector 99 designed to receive the pins 1-24 according precisely to the specifications indicated by FIGS. 4-6 may nevertheless be used to receive pins that are positioned close to such specifications without damaging the module 110, such as warping or breaking the pins. Such alternative positioning is encompassed within the meaning of the terms "about," "substantially," and "approximate."

FIGS. 7-9 depict an embodiment of the module 110 for which an SMA interface 152 is used in lieu of antenna 117. The SMA interface 152 may be coupled to an external antenna (not shown). The PCB 114 depicted by FIGS. 7-9 has holes 134 through which screws or other coupling devices may pass in order to secure the PCB 114 to an external device, such as the PCB 93 of the node 33. In this regard, the PCB 93 has holes 136 (FIG. 2). Each hole 136 is positioned such that it has close to the same dimensions as and is aligned with a respective one of the holes 134 of the PCB 114 when the pins 1-24 of the module 110 are inserted into the receptacles 101-124, as shown by FIG. 3. FIG. 3 depicts screws 141 that are used to secure the module 110 to the node 33. In this regard, each screw 141 passes through a pair of aligned holes 134, 136 and is coupled to a nut 142. Securing the module 110 to the base PCB 93 with screws 141 or other types of coupling devices, helps to prevent movement of the pins 1-24 relative to receptacles 101-124 when a user is connecting an antenna or cable to the SMA interface 152 thereby helping to prevent such movement from damaging the pins 1-24 or other components of the module 110.

In one exemplary embodiment, pins 1, 21, and 24, also referred to herein as "power supply pins," are for receiving electrical power, which is used to power the circuitry 112. In this regard, pins 1 and 24 are coupled to a ground bus (not specifically shown) of the module 110, and pin 7 is coupled to a $V_{cc}$ bus (not specifically shown) of the module 110. Electrical components of the module 110 are coupled to the ground bus and the $V_{cc}$ bus in order to receive electrical power from such buses. Note that each of the pins 1 and 24 is inserted into an end receptacle of a respective one of the connectors 99. In this regard, each connector 99 has a receptacle, referred to herein as "end receptacle," positioned adjacent to an end of the connector 99. Thus, the end receptacle is the last receptacle of its receptacle row. Pin 1 is inserted into an end receptacle for one of the rows 99, and pin 24 is inserted into an end receptacle for the other row 99.

Pin 23 is used for communicating a reset condition to and/from circuitry 112. Further, pins 2-4 and 22 are bidirectional input/output (I/O) pins. Pins 5-11, also referred to herein as "serial I/O pins," are for serial I/O, such as for example, RS232 communication. In addition, pins 13-20, also referred to herein as "analog pins," are for either analog or digital I/O. In this regard, referring to FIG. 11, the circuitry 112 comprises analog-to-digital (A/D) converters 153-160 that are each configured to convert an analog signal from a respective pin 13-20 to a digital signal for digital processing by the circuitry 112. Exemplary uses and configurations of the pins 1-24 will be described below with reference to FIG. 10.

Figure 10:
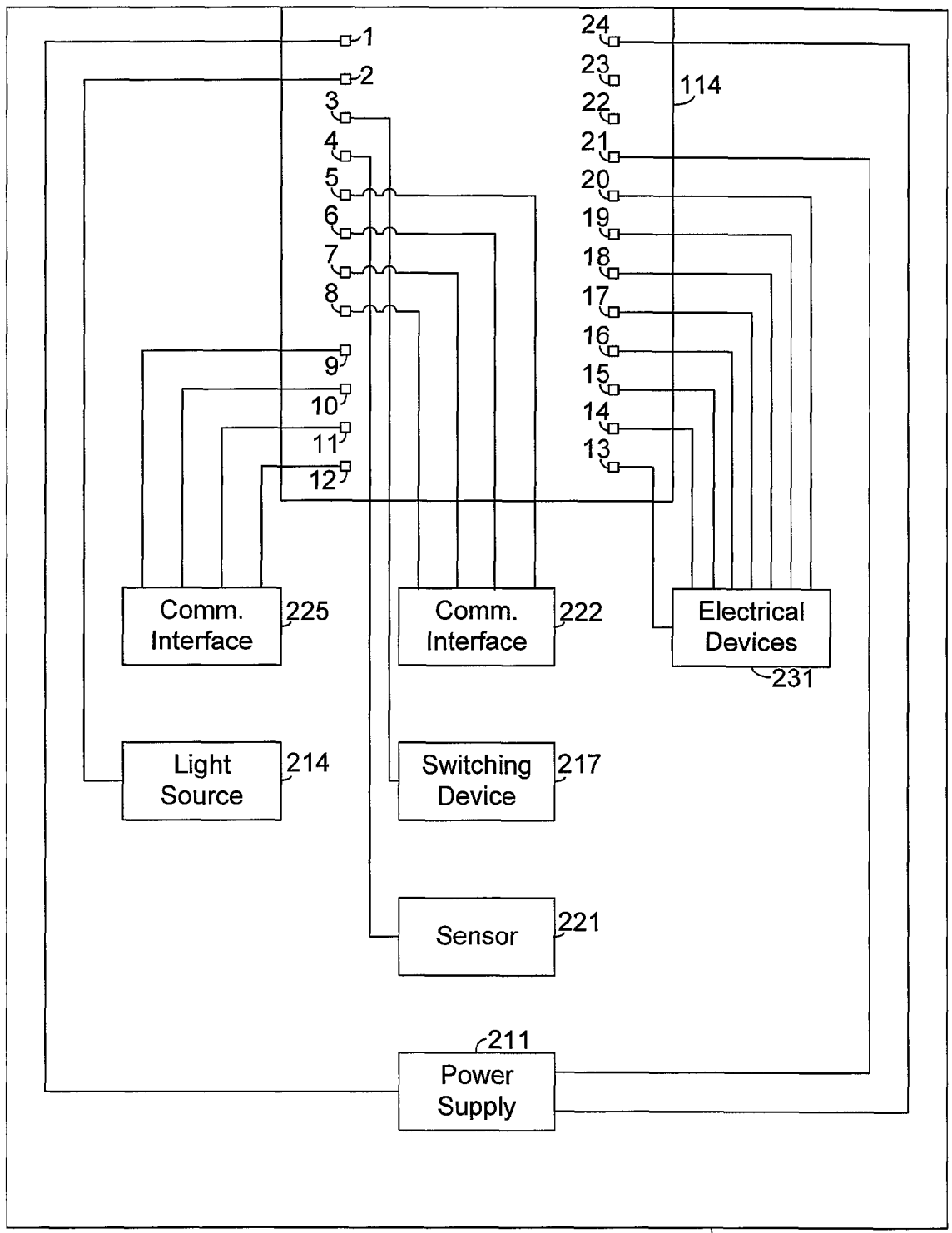
FIG. 10 is a block diagram illustrating an exemplary wireless communication module, such as is depicted in FIG. 1, interfaced with an exemplary sensor node, such as is depicted in FIG. 2.
Figure 11:
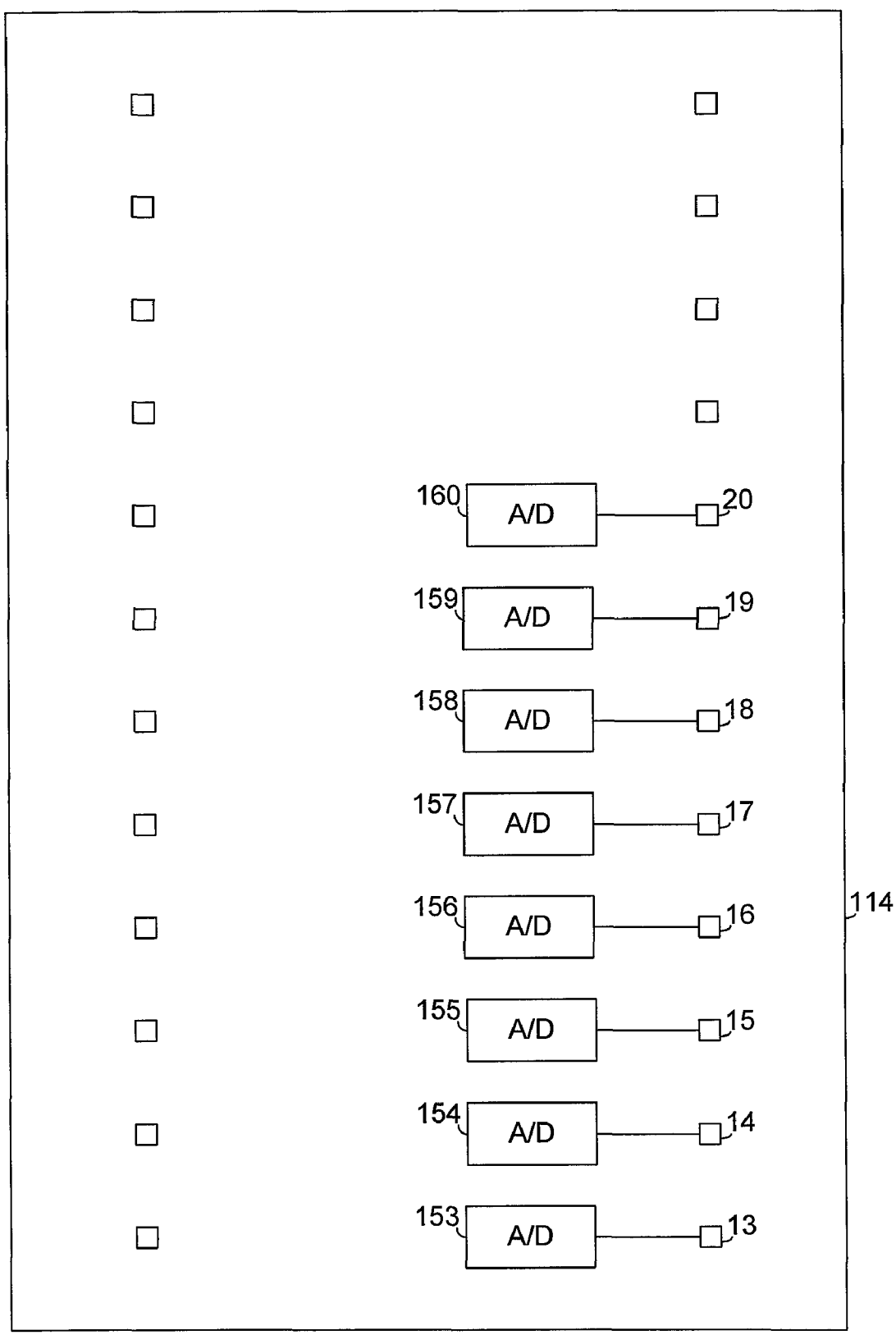
FIG. 11 is a block diagram illustrating an exemplary wireless communication module, such as is depicted in FIG. 1.

In one exemplary embodiment, pins 1, 21, and 24 are electrically coupled to a power supply 211 (FIG. 10). In addition, the power supply 211 comprises one or more batteries residing on the PCB 93 of node 33. Other types of power supplies may be used in other embodiments. Further, pins 1 and 24 are coupled to ground (GND), and pin 21 is electrically coupled to a component of the power supply 211 at a different voltage ($V_{cc}$) relative to ground.

Pin 2 is electrically coupled to a light source 214. In one exemplary embodiment, the light source 214 comprises a light emitting diode (LED) or other type of light source residing on the base PCB 93, and signals for controlling such light source are transmitted from the circuitry 112 via pin 2. Pin 3 is coupled to a switching device 217. In one exemplary embodiment, the switching device 217 resides on the base PCB 93 and comprises a button that can be pressed by a user. The circuitry 112 receives an input signal from the switching device 217 via pin 3.

Pin 4 is coupled to a sensor 221 residing on the PCB 36, and signals for controlling the on/off state of the sensor 221 are transmitted from the circuitry 112 via pin 4. Pins 5-8 are coupled to a communication interface 222, such as an universal serial bus (USB) port or other type of interface residing on the base PCB 93. In this regard, data from the interface 222 is received by the circuitry 112 via pin 5, and data is transmitted to the interface 222 by the circuitry 112 via pin 6. Pins 7 and 8 are used for controlling the flow of data over pins 5 and 6. In addition, pins 9-12 are coupled to a communication interface 225, such as an RS-232 port or other type of interface residing on the base PCB 93. In this regard, data from the interface 225 is received by the circuitry 112 via pin 9, and data is transmitted to the interface 225 by the circuitry 112 via pin 10. Pins 11 and 12 are used for controlling the flow of data over pins 9 and 10.

In addition, pins 13-20 are coupled to various electrical devices 231 residing on the base PCB 93. For example, the electrical devices 231 may comprise sensors, display devices, switching devices (e.g., relays), or other types of devices depending on the desired application for the node 33.

The aforementioned uses of the pins 1-24 are exemplary, and any of the pins 1-24 may be used in a manner different than that described above and may be coupled to other types of devices.

Now, therefore, the following is claimed:

1. A wireless communication module, comprising:
   a first printed circuit board (PCB);
   a first row of conductive pins for interfacing with a female connector on a second PCB of a network node, the first row of conductive pins extending from a side of the PCB;
   a second row of conductive pins for interfacing with a female connector on the second PCB, the second row of conductive pins extending from the side of the PCB; and
   circuitry residing on the first PCB, the circuitry configured to receive a first plurality of data packets transmitted over a wireless network, the circuitry configured to depacketize the first plurality of data packets thereby recovering a first set of data, the circuitry further configured to transmit the first set of data, via at least one of the pin of the first or second row, to circuitry residing on the second PCB,
   wherein the first row is substantially parallel to the second row, wherein a separation distance between pin centers of the first row and pin centers of the second row is about 1.29 inches, and wherein a distance from a center of a pin of the first row to a center of an adjacent pin of the first row is about 0.08 inches.

2. The module of claim 1, wherein each pin of the first row has a center that is about 0.08 inches from a center of a respective pin of the first row, and wherein each pin of the second row has a center that is about 0.08 inches from a center of a respective pin of the second row.

3. The module of claim 1, wherein the first and second rows are substantially parallel to a first axis, and wherein each of the pins of the first row is aligned with a respective pin of the second row along a second axis that is perpendicular to the first axis.

4. The module of claim 1, further comprising an analog-to-digital (A/D) converter, wherein the first row has an analog pin coupled to the A/D converter, and wherein the second row has a power supply pin positioned adjacent to the analog pin.

5. The module of claim 4, further comprising an antenna residing on the PCB.

6. The module of claim 4, wherein a center of the power supply pin is about 0.08 inches from a center of the analog pin.

7. The module of claim 4, wherein the first and second rows are substantially parallel to a first axis, and wherein the first row has a plurality of serial input/output (I/O) pins, one of the serial I/O pins substantially aligned with the analog pin of the second row along a second axis that is perpendicular to the first axis.

8. The module of claim 1, wherein the first row has a plurality of serial input/output (I/O) pins, wherein the second row has a power supply pin, wherein the first and second rows are substantially parallel to a first axis, and wherein a pin adjacent one of the serial I/O pins is aligned with the power supply pin of the second row along a second axis that is perpendicular to the first axis.

9. The module of claim 1, wherein the first PCB has a first hole and a second hole, a center of the first hole separated from a center of the second hole by about 0.98 inches.

10. The module of claim 1, wherein the circuitry residing on the first PCB is further configured to receive a second set of data from the network node via at least one of the pins of the first or second row, the circuitry residing on the first PCB further configured to packetize the second set of data into a second plurality of data packets and to transmit the second plurality of data packets over the wireless network.

11. The module of claim 1, wherein the each of the pins of the first and second rows is inserted into a respective receptacle of a sensor node in a wireless sensor network.

12. A node for use in a wireless sensor network, comprising:
   a wireless communication module having a first printed circuit board (PCB), a first row of conductive pins extending from the first PCB, a second row of conductive pins extending from the first PCB, and first circuitry residing on the first PCB, wherein the first row is substantially parallel to the second row, wherein a separation distance between pin centers of the first row and pin centers of the second row is about 1.29 inches, and wherein a distance from a center of a pin of the first row to a center of an adjacent pin of the first row is about 0.08 inches;

a second PCB;
a first row of receptacles residing on the second PCB and receiving the first row of pins;
a second row of receptacles residing on the second PCB and receiving the second row of pins; and
second circuitry residing on the second PCB, the second circuitry comprising a power supply coupled to a power supply pin of the second row of conductive pins, the first and second circuitry configured to communicate data serially via a plurality of serial input/output (I/O) pins of the first row of conductive pins, wherein the first and second rows of conductive pins are substantially parallel to a first axis, and wherein one of the serial I/O pins is substantially aligned with a pin of the second row of conductive pins along a second axis that is perpendicular to the first axis, and wherein the power supply pin is adjacent to the pin substantially aligned with the one I/O pin,
wherein the first circuitry is configured to receive a first plurality of data packets and to depacketize the first plurality of data packets thereby recovering a first set of data, the first circuitry configured to transmit the first set of data to the second circuitry via the serial I/O pins.

13. The node of claim 12, wherein each pin of the first row of conductive pins has a center that is about 0.08 inches from a center of a respective pin of the first row of conductive pins, and wherein each pin of the second row of conductive pins has a center that is about 0.08 inches from a center of a respective pin of the second row of conductive pins.

14. The node of claim 12, wherein the first and second rows of conductive pins are substantially parallel to a first axis, and wherein each of the pins of the first row of conductive pins is substantially aligned with a respective pin of the second row of conductive pins along a second axis that is perpendicular to the first axis.

15. The node of claim 12, further comprising an antenna residing on the first PCB.

16. The node of claim 12, wherein a center of the power supply pin is about 0.08 inches from a center of the pin that is substantially aligned with the one serial I/O pin.

17. The node of claim 12, further comprising an analog-to-digital (A/D) converter, wherein the second row of conductive pins has an analog pin coupled to the A/D converter.

18. The node of claim 17, wherein the first and second rows of conductive pins are substantially parallel to a first axis, and wherein one of the serial I/O pins of the first row of conductive pins is substantially aligned with the analog pin of the second row along a second axis that is perpendicular to the first axis.

19. The node of claim 12, wherein the first PCB has a first hole and a second hole, a center of the first hole separated from a center of the second hole by about 0.98 inches.

20. The node of claim 12, wherein the second circuitry is configured to transmit a second set of data to the first circuitry via the serial I/O pins, and wherein the first circuitry is configured to packetize the second set of data into a second plurality of data packets and to transmit the second plurality of data packets.

21. The node of claim 12, wherein one of the rows of receptacles has an end receptacle at an end of the one row, wherein one of the rows of conductive pins has a power supply pin inserted into the end receptacle.

22. A node for use in a wireless sensor network, comprising:
a wireless communication module having a first printed circuit board (PCB), a first row of conductive pins extending from the first PCB, a second row of conductive pins extending from the first PCB, and first circuitry residing on the first PCB, wherein the first row is substantially parallel to the second row, wherein a separation distance between pin centers of the first row and pin centers of the second row is about 1.29 inches, and wherein a distance from a center of a pin of the first row to a center of an adjacent pin of the first row is about 0.08 inches;
a second PCB;
a first row of receptacles residing on the second PCB and receiving the first row of conductive pins;
a second row of receptacles residing on the second PCB and receiving the second row of conductive pins; and
second circuitry residing on the second PCB, one of the first or second rows of receptacles having an end and a receptacle positioned adjacent to the end, the sensor node having a power supply coupled to one of the pins of the first or second row of conductive pins, the one pin inserted into the receptacle positioned adjacent to the end,
wherein the first circuitry is configured to receive a first plurality of data packets and to depacketize the first plurality of data packets thereby recovering a first set of data, the first circuitry configured to transmit the first set of data to the second circuitry via at least one pin of the first or second row of conductive pins.

* * * * *